United States Patent [19]
Goeldner

[11] Patent Number: 5,325,358
[45] Date of Patent: Jun. 28, 1994

[54] METHOD AND CIRCUIT ARRANGEMENT FOR TRANSMITTING MESSAGE PACKETS VIA PACKET SWITCHING EQUIPMENT, THE MESSAGE PACKETS BEING TRANSMITTED ON OUTPUT TRUNKS

[75] Inventor: Ernst H. Goeldner, Muenchen, Fed. Rep. of Germany

[73] Assignee: Siemens Aktiengesellschaft, Munich, Fed. Rep. of Germany

[21] Appl. No.: 40,913

[22] Filed: Mar. 29, 1993

Related U.S. Application Data

[63] Continuation of Ser. No. 487,220, Mar. 1, 1990, abandoned.

[30] Foreign Application Priority Data

Mar. 3, 1989 [EP] European Pat. Off. ........ 89103798.8

[51] Int. Cl.$^5$ ............................................ H04L 12/56
[52] U.S. Cl. ..................................... 370/60; 370/94.1
[58] Field of Search ................ 370/60, 94.1, 58.1, 370/54, 63, 16, 14; 340/825.8, 825.01, 825.79, 827; 379/17, 291, 335; 371/8.1, 11.1

[56] References Cited

U.S. PATENT DOCUMENTS

| | | | |
|---|---|---|---|
| 4,536,870 | 8/1985 | Bovo et al. | 370/63 |
| 4,651,318 | 3/1987 | Luderer | 370/60 |
| 4,837,761 | 6/1989 | Isono et al. | 370/60 |
| 4,879,712 | 11/1989 | Littlewood | 370/60 |
| 4,893,304 | 1/1990 | Giacopelli et al. | 370/94.1 |
| 4,899,335 | 2/1990 | Johnson, Jr. et al. | 370/60 |
| 4,901,309 | 2/1990 | Turner | 370/60 |
| 4,907,220 | 3/1990 | Rau et al. | 370/60 |
| 4,918,686 | 4/1990 | Hayashi et al. | 370/60 |
| 4,955,017 | 9/1990 | Eng et al. | 370/60 |
| 4,991,168 | 2/1991 | Richards | 370/54 |
| 4,993,018 | 2/1991 | Hajikano et al. | 370/60 |
| 5,117,417 | 5/1992 | Danner | 370/84 |
| 5,140,588 | 8/1992 | Danner | 370/94.1 |
| 5,198,808 | 3/1993 | Kudo | 370/60 |

OTHER PUBLICATIONS

Newman P., "A Broadband Packet Switch for Multi-Service Communications," IEEE INFOCOM '88, Mar. 1988, pp. 1A.3.1–1A.3.10.

Dias et al. "Packet Switching in Log N Multistage Networks" GLOBECOM '84, Nov. 1984, pp. 5.2.1–5.2.7.

Roggenkamp E., "Das Elektronishe Datenvermittlungssystem EDS" Unterrichtsblätter, vol. 8, No. 11, 1972, pp. 263–266.

*Primary Examiner*—Douglas W. Olms
*Assistant Examiner*—Dang Ton
*Attorney, Agent, or Firm*—Hill, Steadman & Simpson

[57] ABSTRACT

Message packets are transmitted via a packet switching equipment which comprises at least two redundant switching matrices to output ports connected thereto, the message packets comprising a packet header identifying a respective virtual connection and being transmitted on input trunks according to an asynchronous transmission method during the course of virtual connections. A message packet group having a plurality of identical message packets corresponding in number to the plurality of redundant switching matrices by multiplication for each of the message packets transmitted on one of the input trunks during the course of a virtual connection. An identical auxiliary identifier that changes for successive message packet groups is thereby attached to each of the message packets of a message packet group. The message packets of a message packet group are subsequently separately transmitted via the redundant switching matrices in the direction toward the output port considered for the respective virtual connection. After such a transmission, only one of the message packets of a message packet group is forwarded to the output port with reference to the auxiliary identifier respectively attached to the message packets.

11 Claims, 2 Drawing Sheets

METHOD AND CIRCUIT ARRANGEMENT FOR TRANSMITTING MESSAGE PACKETS VIA PACKET SWITCHING EQUIPMENT, THE MESSAGE PACKETS BEING TRANSMITTED ON OUTPUT TRUNKS

This is a continuation of application Ser. No. 07/487,220, filed Mar. 1, 1990 now abandoned.

BACKGROUND OF THE INVENTION

1. Field of the Invention

The present invention relates to a method and to a circuit arrangement for transmitting message packets via packet switching equipment which comprises at least two redundant switching matrices to input ports connected thereto, the message packets comprising a packet header identifying a respective virtual connection and being transmitted on output trunks in an asynchronous transmission method during the course of virtual connections.

2. Description of the Prior Art

Switching equipment for communications networks must enable an uninterrupted, disturbance-free switching operation. Since, however, individual components have a certain failure probability, the structure of switching equipment must be selected such that disturbance-free operation of the overall system is guaranteed in spite of the failure of individual components. It is already known in this context to redundantly design central equipment of a data switching system (for example, from "Unterrichtsblaetter der Deutschen Bundespost", Vol. 25, No. 11, 1982, pp. 263-266). What this redundancy assures is that backup routes can be switched given failure of one of the central equipment. However, it is necessary to provide appropriate monitoring and control measures in the data switching system for this purpose.

SUMMARY OF THE INVENTION

It is therefore an object of the invention to provide redundant packet switching equipment with little control expense given a method and a circuit arrangement of the type set forth above.

In a method of the type set forth above, the aforementioned object is achieved, according to the present invention, in that a message packet group having a plurality of identical message packets corresponding in number to the plurality of redundant switching matrices is formed by a multiplication for each of the message packets transmitted on one of the trunks during the course of a virtual connection; in that an identical auxiliary identifier changing for successive message packet groups is attached to each of the message packets of a message packet group; in that the message packets of a message packet group are separately transmitted via the redundant switching matrices in the direction toward the output port coming into consideration for the respective virtual connection; and in that, following such a transmission via the redundant switching matrices, only one of the message packets belonging to a message packet group is transmitted to the output port coming into consideration, being transmitted with reference to the auxiliary identifier respectively attached to the message packets.

The present invention offers the advantage that a disturbance-free switching operation is still possible in a packet switching equipment as long as a continuous path via one of the switching matrices is present for each of the virtual connections. The redundancy is thereby present on the level of the virtual connections and not on the level of the transmission lines extending within the packet switching equipment. The effects of a malfunctioning switching matrix remain considerably lower due to the redundance on the level of the virtual connections since only the virtual connections directly affected are disturbed. Involved monitoring measures in the redundant switching matrices that would be necessary given a redundancy concept on the level of the transmission lines are thereby eliminated.

A further advantage is in the insertion of an auxiliary identifier into the message packets to be transmitted via the switching matrices. These auxiliary identifiers enable a transmission of message packets via the redundant switching matrices without synchronous operation being required among the redundant switching matrices. This is of particular significance for redundant packet switching equipment in a broadband communications network in which message packets are to be transmitted with a high transmission rate.

According to a feature of the invention, the method is further particularly characterized in that a message packet sequence number respectively inserted into the packet header of the message packets belonging to a virtual connection and continuously assigned for the respective virtual connection is used as an auxiliary identifier.

According to another feature of the invention, the method is particularly characterized in that respective check information is attached to each of the message packets belonging to a message packet group, and in that, after the transmission of message packets via the redundant switching matrices, a check of the respective message packet or, respectively, packet header in view of a faultless transmission is first carried out with reference to the check information respectively attached to the message packets.

According to another feature of the invention, the method is particularly characterized in that the message packets belonging to a respective message packet group are transmitted on identical paths via the redundant switching matrices o the basis of self-routing headers entered into the packet headers of the message packets during formation of the message packet group.

The advantage of the above features is in the low control expense for offering the auxiliary header to be respectively attached to the message packets or, respectively, for a monitoring of the message packets transmitted via the switching matrices with respect to faultless transmission.

A circuit arrangement for the implementation of the method of the present invention and the advantages thereof are also set forth. The advantage therefore lies in the low circuit-oriented expense for forwarding message packets via the redundantly-designed packet switching equipment. This basic advantage is obtained in a circuit arrangement for transmitting message packets via packet switching equipment comprising at least two redundant switching matrices to serving ports connected thereto, the message packets comprising a packet header identifying the respective virtual connection and being transmitted on output trunks according to an asynchronous transmission method during the course of the virtual connections, and is particularly characterized in that a handling device is assigned to each of the output trunks, the handling device, first of all, attaching a respective auxiliary header that changes for successive message packets to the message packets transmitted by the respective output trunk and, secondly, forming a respective message packet group from the message packets augmented by the auxiliary identifier and having a plurality of identical message packets corresponding in number to the plurality of redundant switching matrices, the identical message packets being supplied to the redundant switching matrices; and in that each of the input ports has an evaluation device assigned thereto that accepts message packets transmitted via the redundant switching matrices and which outputs only one of the message packets belonging to the message packet group to the assigned output port of the basis of the auxiliary identifier respectively attached to the message packets and, as warranted, on the basis of the auxiliary identifier that is available and it is just used preceding from the handling device in the formation of a message packet group for the respective virtual connection.

A circuit arrangement constructed in accordance with the present invention is further characterized in that a respective memory device having a plurality of memory cells is provided in the handling device and in the evaluation device, the auxiliary identifier that is presently current for the formation or, respectively, for the evaluation of a message packet group being individually stored in the memory cells for the individual virtual connections; in that the memory cells are respectively selectable for an offering of the stored auxiliary identifier on the basis of the particulars respectively contained in the packet header of the message packets and identifying the respective virtual connection; and in that the auxiliary identifier stored in a memory cell is updated in response to each selection of a memory cell.

A circuit arrangement constructed in accordance with the present invention may also be particularly characterized in that a message packet sequence number to be attached to the packet header of the individual message packet is stored in the memory cells as an auxiliary identifier, the message packets sequence number being set to a defined initial value during the course of the connection set-up of the respective virtual connection and being incremented with each selection of the respective memory cell.

A circuit arrangement according to the present invention may also be particularly characterized in that a respective self-routing header to be respectively attached to the packet headers of the message packets to be transmitted to the redundant switching matrices and respectively define for the respective virtual connection is additionally stored in the memory cells of the memory device belonging to the handling device.

According to another feature of the invention, the circuit arrangement may be particularly characterized in that a comparator arrangement is provided in the evaluation device, the comparator arrangement comparing the auxiliary identifier contained in a message packet just accepted by one of the redundant switching matrices to the auxiliary identifier offered by the memory device and, given a coincidence of the two auxiliary identifiers, controlling the transmission of the respective message packet to the allocated output port.

According to another feature of the invention, the circuit arrangement may be particularly characterized in that the handling device has a check signal generator belonging thereto that additionally attaches a respective check information to the message packets; in that a check device is assigned to each of the redundant switching matrices in the evaluation device, the check device executing a check in view of a faultless transmission of the respective message packet or, respectively, respective packet header on the basis of the check information respectively attached to the message packets accepted by the allocated switching matrices; and in that the evaluation device undertakes an evaluation of the auxiliary identifier attached to a message packet only given a faultless transmission of the message packet.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
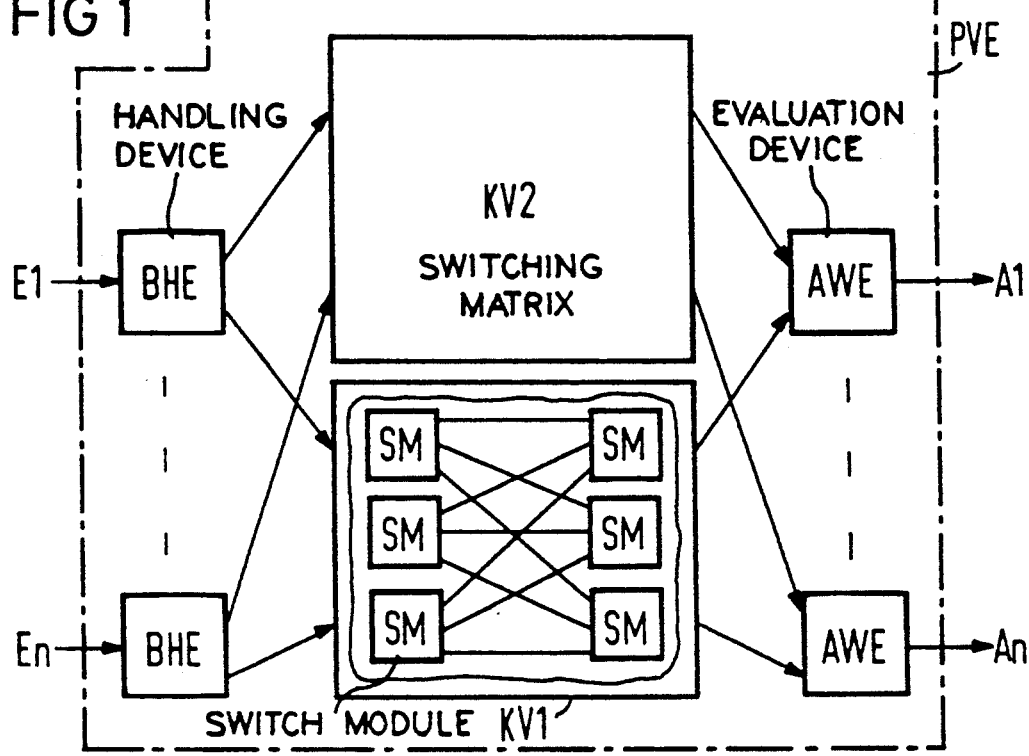
FIG. 1 is a schematic representation of a packet switching equipment employing the present invention.

Referring to FIG. 1, a packet switching system PVE is schematically illustrated as being connected to a plurality of input trunks E1-En and a plurality of output ports A1-An. Of these, only the input trunks E1 and En and the output ports A1 and An are specifically shown in FIG. 1. A transmission of message packets during the course of virtual connections respectively occurs on the input trunks and output ports in accordance with an asynchronous transfer mode. It is here assumed that the message packets are packets of fixed length and that each respectively have a packet header having particulars identifying the respective virtual connection as well as an information part. The transmission of the actual message signals occurs in the information part. What are thereby understood as message signals are data and text signals as well as voice or, respectively, image signals in digital form.

As proceeds from FIG. 1, each of the input trunks E1-En has a handling device BHE assigned thereto. First of all, such a handling device, whose structure shall be discussed in greater detail below, attaches a respective auxiliary identifier to the message packets transmitted via the respective input trunk and belonging to a virtual connection, the auxiliary identifier respectively changing for successive message packets of the respective virtual connection. Secondly, it forms two identical message packets from the message packets augmented by the auxiliary identifier, the identical message packets being referred to below as a message packet group, and connects these to redundant switching matrices KV1 and KV2 of the packet switching system PVE. With reference to the switching matrices KV2, FIG. 1 schematically indicates that the two switching matrices KV1, KV2 are each respectively assumed to comprise a plurality of switch modules SM interconnected to one another. Since the structure and operation of such switching matrices are already known, no further discussion thereof shall be provided herein.

Each of the switching matrices KV1, KV2 comprises a plurality of output lines. A respective output line of the switching matrix KV1 and an output line of the switching matrix KV2 are thereby supplied, in common, to a separate evaluation device AWE. These evaluation devices AWE are each respectively connected to one of the output ports A1-An. Such an evaluation device AWE accepts the message packets transmitted via the two switching matrices KV1, KV2 and, on the basis of an evaluation of the auxiliary identifier respectively attached to the message packets which shall be set forth in greater detail below, outputs only one of the message packets, belonging to a message packet group, to the allocated offering port.

It should be pointed out with respect to the packet switching system PVE just set forth that this, in fact, comprises redundant switching matrices according to FIG. 1. The plurality of redundant switching matrices, however, can also be increased accordingly, dependent on the failure probability of each of the switching matrices and on the required values for the availability of the packet switching system.

Figure 2:
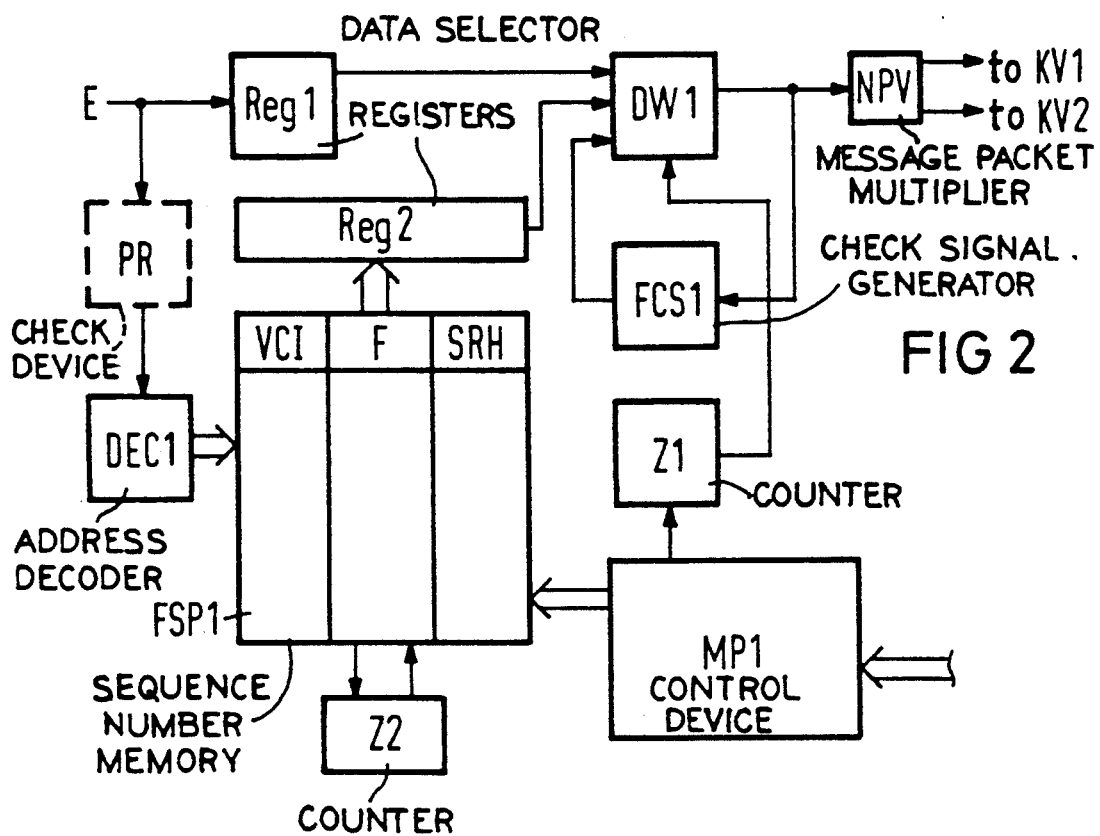
FIG. 2 is a schematic representation illustrating a possible structure of a handling device of the type schematically illustrated in FIG. 1 as a single block.

FIG. 2 illustrates a possible structure of the aforementioned handling system BHE. Only those circuit parts that are required for an understanding of the present invention are included in FIG. 2.

A register Reg1 is connected to the respective input trunk that is referenced E in FIG. 2. The information part of a message packet transmitted over the offering trunk is accepted into this register. The packet header belonging to the respective message packet, by contrast, is supplied to an address decoder DEC1. This address decoder DEC1 can thereby also be preceded by a check device PR, indicated with broken lines in FIG. 2, that undertakes a check of the packet header for faultless transmission in case such a check is provided in terms of the transmission procedure. The address decoder DEC1 decodes the particulars contained in the supply packet header in the form of a virtual channel number VCI and identifying the respective, virtual connection and offers corresponding output signals. These output signals are supplied as address signals to a sequence number memory FSP1. The sequence number memory FSP1 comprises a separate memory cell for each of the virtual connections possible on the appertaining input trunk E. The memory cells can be selected based on the measure of the virtual channel number VCI decoded by the afore-mentioned address decoder DEC1. As schematically illustrated in FIG. 2, a virtual channel number VCI, a sequence number F, and a self-routing header SRH are stored in respective ones of the memory cells. Together, these three particulars form a new packet header that, as shall be set forth below, precedes an information part of a message packet just accepted into the register Reg1 for the transmission thereof. The reference VCI thereby represents that virtual channel number that is to be used for a transmission of a message packet via the serving port coming into consideration for the respective virtual connection. The sequence number F is a matter of the afore-mentioned auxiliary identifier that is to be attached to each message packet accepted into the handling device BHE. This sequence number is individually defined for the individual virtual connections. It is thereby provided in the present exemplary embodiment that the respective sequence number is set to a defined starting value during the course of setting up a virtual connection and is incremented with each access to the respective memory cell. The incrementation thereby occurs with the assistance of a counter Z2, as schematically indicated in FIG. 2. The self-routing header SRH within the packet switching system PVE shown in FIG. 1 serves for a transmission of the respective message packet via the switching matrices KV1 and KV2.

The particulars that were just cited, moreover, are entered into the memory cell respectively coming into consideration in the sequence number memory FSP1 during the course of setting up a virtual connection, being entered thereinto proceeding from a control device MP1 that, for example, can be assumed to be a microprocessor.

Given the aforementioned selection of a memory cell of the sequence number memory FSP1 by the address decoder DEC1, the packet header stored in this memory cell is read out and transferred into a register Reg2. At its output side, the register Reg2 is in communication with an input of a data selector DW1. The output of the aforementioned register Reg1 is connected to a second input of this data selector DW1. At its output side, the data selector DW1 is connected, first of all, to a message packet multiplier NPV and, secondly, to a check signal generator FCS1. This check signal generator FCS1 has its output side in communication with a third input of the data selector DW1.

The aforementioned data selector DW1 is controlled by a counter Z1 such that, first of all, the packet header transferred into the register Reg2 and, subsequently, the information part stored in the register Reg1 are serially supplied to the message packet multiplier NPV. With the passage of this message packet formed in such fashion, the check signal generator FCS1 forms a check information (frame check sequence) that, under the control of the counter Z1, is attached to the information part of the message packet just then being transmitted.

For the control of the data selector DW1, moreover, the counter Z1 is supplied with a corresponding start signal proceeding from the aforementioned control device MP1.

The message packet multiplier NPV undertakes a multiplication, a doubling in the exemplary embodiment under discussion here, of the message packet just supplied thereto and conducts the identical message packets thus arising to the switching matrices KV1 and KV2 shown in FIG. 1 via separate lines. The message packet multiplier NPV, for example, can thereby be formed of an operational amplifier having a plurality of outputs. The transmission path via these switching matrices KV1, KV2 is then fixed by the self-routing headers transmitted in the message packets. Since the identical message packets output by the message packet multiplier NPV each have the respective same self-routing header attached thereto, the message packets traverse the switching matrices KV1 and KV2 on identical paths.

Figure 3:
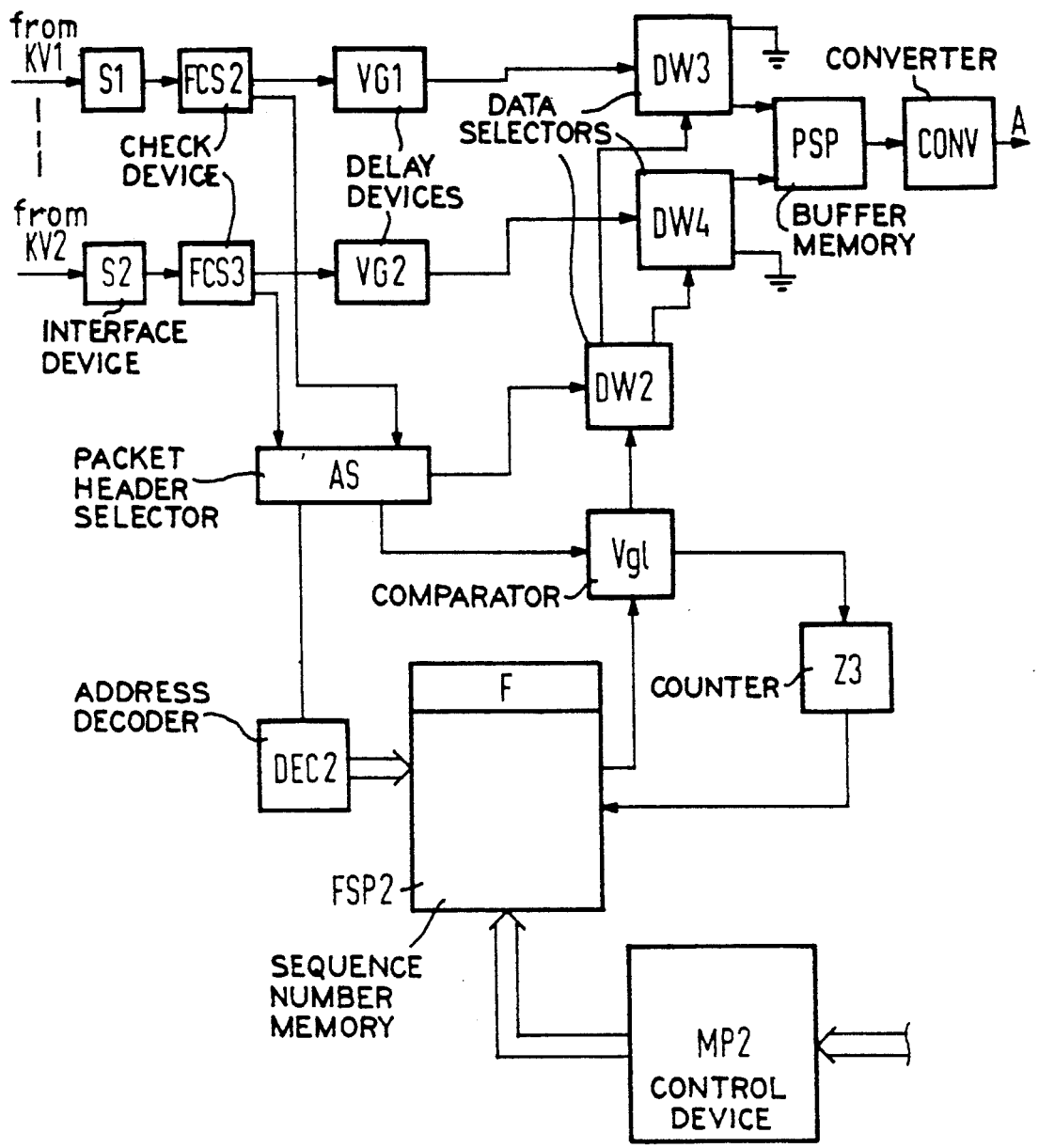
FIG. 3 is a schematic representation of a possible structure of an evaluation device of the type which is only schematically illustrated in FIG. 1 as a single block.

FIG. 3 shows a possible structure of the evaluation device AWE shown in FIG. 1. The message packets of a message packet group transmitted via the switching matrices KV1 and KV2 first pass through interface devices S1 and S2. These essentially serve the purpose of defining the beginning of a message packet. The interface devices S1, S2 are each respectively followed by a check device FCS2 or, respectively, FCS3. A checking with respect to a faultless transmission occurs with the assistance of these check devices FCS2, FCS3 with reference to the check information respectively attached to the message packets. When such a faultless transmission is present, then the message packet just checked by the check device FCS2 is supplied to a delay device VG1. In a corresponding fashion, the check device FCS3 forwards the message packet just checked to a delay device VG2 given a faultless transmission. The packet header of each of the message packets is additionally conducted to a selection circuit which is provided as a packet header selector AS. When two packet headers thereby arrive simultaneously, the packet header selector AS selects only one and conducts the virtual channel number VCI contained in this packet header to an address decoder DEC2. The latter decodes this virtual channel number and outputs appropriate output signals. These output signals serve as address signals for the selection of a sequence number memory FSP2 comprising a plurality of memory cells. The memory cells are individually assigned to the virtual connections that can proceed via the serving port connected to the evaluation device AWE. A sequence number F is thereby stored in each of the memory cells, the sequence number F being set to the same starting value by a control device MP2 during the course of setting up the respective virtual connection, namely, to the starting value as the sequence number stored in the sequence number memory FSP1 (FIG. 2) for the respective virtual connection. The control device MP2, moreover, can be composed of a microprocessor.

In response to the aforementioned selection of the sequence number memory FSP2 by the address decoder DEC2, the sequence number F stored in the memory cell coming into consideration is supplied to a first input of a comparator Vg1. By contrast, the sequence number contained in the packet header just selected is supplied to a second input of this comparator from the packet header selector AS. The comparator Vg1 has a first output in communication with a data selector DW2. The data selector DW2 is controlled from the packet header selector AS based on the measure of the packet header just selected thereby, being controlled such that a comparison signal output by the comparator Vg1 is supplied either to a data selector DW3 or to a data selector DW4 as a control signal. The data selector DW3 thereby has its input side in communication with a delay device VG1; the data selector DW4, by contrast, is in communication with a delay device VG2. A first output of each of the data selectors DW3 and DW4 is connected to a buffer memory PSP designed as a first-in-first-out (FIFO) memory. A second output of each of the two data selectors DW3, DW4, by contrast, is applied to ground.

Given a coincidence of the sequence numbers just supplied to the comparator Vg1, the comparator Vg1 controls the data selector DW3 or, respectively, DW4 selected by the packet header selector AS via the data selector DW2 such that the message packet output by the appertaining delay device (VG1 or, respectively, VG2) is transferred into the buffer memory PSP. Simultaneously, the comparator Vg1 supplies the sequence number output proceeding from the sequence number memory FSP2 to a counter Z3 via a second output, the counter Z3 incrementing the sequence number and entering the sequence number resulting therefrom into the memory cell coming into consideration in the sequence number memory FSP2 as a current sequence number. The sequence number previously stored therein is thereby overwritten.

When, for a further evaluation, the packet header selector AS subsequently selects a packet header of a message packet that belongs to the same message packet group as the message packet previously entered into the buffer memory PSP, then the comparator Vg1 identifies a non-coincidence of the sequence numbers compared to one another due to the sequence number modified in the sequence number memory FSP2. As a result of this comparison result, the comparator Vg1 controls the data selector DW3 or, respectively, DW4 such that the message packet traversing the appertaining delay means VG1 or, respectively VG2, is supplied to that output of the appertaining data selector that is applied to ground. What is assured in this fashion is that only the first recognized message packet belonging to a message packet group is entered into the buffer memory PSP for transmission to the appertaining output port. The further message packet of a message packet group in the present exemplary embodiment, by contrast, is considered a copy of the message packet previously forwarded and, consequently, is suppressed.

The message packets accepted into the buffer memory PSP are forwarded in the sequence of their write-in to a serving port connected to the evaluation device AWE shown in FIG. 3. This serving port is referenced A in FIG. 3. During this forwarding, the individual message packets pass through a converter CONV that removes the self-routing header previously contained in the message packets. This served only for the transmission of message packets via the switching matrices KV1 and KV2 within the packet switching equipment PVE shown in FIG. 1. Such information is no longer required for a transmission of the message packets via the appertaining output port.

In a departure from the exemplary embodiments set forth above, an auxiliary identifier that is independent of the respective virtual connection and that changes for the successive message packet groups can also be attached to the message packets belonging to a message packet group proceeding from the handling device BHE instead of a sequence number defined for the respective virtual connection. For example, counter signals of a free-wheeling counter can be utilized as such auxiliary identifiers. In this case, a storing of the sequence numbers in the sequence number memory FSP1 (FIG. 2) for the individual virtual connections can be eliminated. This auxiliary identifier is then to be retained in a memory for a prescribed time in the respective evaluation device AWE for the respective virtual connection only with the first appearance of a specific auxiliary identifier in an accepted message packet and the respective message packet is to be forwarded to the output port coming into consideration. Given a renewed appearance of this auxiliary identifier, the appertaining message packet is to be considered a copy of the message packet previously transmitted and, consequently, is to be suppressed.

In addition to the foregoing, the transmitting of message packets via the switching matrices KV1, KV2 of the packet switching system PVE (FIG. 1) can occur according to the known reevaluation or route interpretation principle, so that the insertion of self-routing headers into the message packets can be eliminated. However, the storing of these information and the sequence number memory FSP1 can therefore also be eliminated.

Given the presence of a plurality of switching matrices KV1, KV2 in a packet switching system, it should also be pointed out that the information of a message packet group can occur either with the assistance of a single message packet multiplier having a corresponding plurality of outputs or can occur step-by-step upon employment of a plurality of message packet multipliers. Given the presence of a plurality of switching matrices KV1, KV2, the resolution of a message packet group having a corresponding plurality of message packets can, in addition, also occur step-by-step upon utilization of a plurality of the afore-mentioned evaluation devices.

In conclusion, it should also be pointed out that the check information attached to each message packet proceeding from the handling device BHE can also be fixed such that this only acquires the packet header of a message packet and that this check information is attached to the packet header. Only a check of the appertaining packet headers in view of an error-free transmission then occurs in the respective evaluation device AWE with reference to the check information attached to the message packets.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

What is claimed is:

1. A method for asynchronously forwarding message packets between input trunks and output trunks via a packet switching system comprising at least two redundant switching matrices interconnecting said input trunks and said output trunks, each switching matrix interconnecting each input trunk to each output trunk, each switching matrix comprising a like plurality of input switch modules and output switch modules and each input switch module is connectable to each output switch module, each message packet comprising a packet header identifying a respective virtual connection, comprising the steps of:
   forming message packet groups of a plurality of identical message packets corresponding in number to the number of redundant switching matrices by multiplying each of the message packets received on an input trunk during the course of a virtual connection;
   attaching an identification identifier to each of the message packets of a message packet group and changing the identifier for each successive message packet group;
   separately transmitting each message packet of a message packet group via each redundant switching matrix toward an output trunk for the respective virtual connection; and
   selecting and forwarding only one of the message packets of a message packet group selected based on the identifier attached thereto to the output trunk for the respective virtual connection.

2. The method of claim 1, wherein the step of attaching an identical identifier to each of the message packets of a message packet group is further defined as:
   inserting a message packet sequence number into the message packet header of the message packets belonging to a virtual connection and continuously assigned for the respective virtual connection.

3. The method of claim 1, and further comprising the step of:
   attaching a respective check information to each of the message packets belonging to a message packet group; and
   after the transmission of the message packets via the redundant switching matrices, checking the respective message packet header in view of the faultless transmission with reference to the check information respectively attached to the message packets.

4. The method of claim 3, wherein:
   the step of forming message packet groups is further defined as entering self-routing headers into the packet headers of the message packets during formation of a message packet group; and
   the step of separately transmitting each message packet of a message packet group via the redundant switching matrices is further defined as transmitting the message packets belonging to a respective message packet group on identical paths via the redundant switching matrices on the basis of the self-routing headers entered into the packet headers of the message packets during the formation of the message packet group.

5. Apparatus for asynchronously transmitting message packets between input trunks and output trunks via a packet switching system, each message packet comprising a packet header identifying a virtual connection, comprising:
   at least two redundant switching matrices, each switching matrix interconnecting each input trunk to each output trunk, each switching matrix comprising a like plurality of input switch modules and output switch modules, each output switch module is connectable to each input switch module;
   first means connected to said input trunks and to said redundant switching matrices and operable to form message packet groups of a plurality of identical message packets corresponding in number to the number of redundant switching matrices including multiplication means for multiplying each of the message packets on an input trunk during the course of a virtual connection;
   second means in said first means and operable to attach an identical identifier to each of the message packets of a message packet group and to change the identifier for each successive message packet group;
   third means connected to said second means and to said redundant switching matrices and operable to separately transmit each message packet of a message packet group via the redundant switching matrices toward a respective output trunk for the virtual connection; and
   fourth means connected to said redundant switching matrices and to said output trunks and operable to transmit only one of the message packets of a message packet group, selected based on the identifier attached to each of the message packets belonging to a message packet group, to the respective output trunk.

6. A circuit arrangement for asynchronously transmitting message packets between input trunks and output trunks via a packet switching system, the message packets comprising a packet header identifying a respective virtual connection and being transmitted according to an asynchronous transmission method during the course of virtual connections, said circuit arrangement comprising:

- at least two redundant switching matrices, each switching matrix interconnecting each input trunk to each output trunk, each switching matrix comprising a like plurality of input switch modules and output switch modules, each input switch module is connectable to each output switch module;
- a plurality of handling means each connected to a respective input trunk and to each of said redundant switching matrices, said handling means operable to attach a respective auxiliary identifier to the packet header of a message packet forming a respective message packet group from the message packets augmented by the auxiliary identifiers and having a plurality of identical message packets corresponding in number to the plurality of redundant switching matrices, and changing the auxiliary identifier for each message packet group and supplying the identical message packets to the redundant switching matrices; and
- a plurality of evaluation devices each connected to each of said redundant switching matrices and to a respective output trunk for receiving message packets transmitted via the redundant switching matrices and outputting only one of the message packets belonging to a message packet group to the allocated output trunk based on the auxiliary identifier respectively attached to the message packets.

7. The circuit arrangement of claim 6, wherein each of said handling devices and each of said evaluation devices comprises:

- memory means including a plurality of memory cells for storing in said memory cells the auxiliary identifier that is presently current for the formation or, respectively, for the evaluation of a message packet group, said memory cells being respectively selectable for a transmission of the stored auxiliary identifier on the basis of the particulars respectively contained in the packet header of the message packets and identifying the respective virtual connection; and
- means for updating the auxiliary identifier in response to each selection of a memory cell.

8. The circuit arrangement of claim 7, and further comprising:

- message packet sequence number means operable to attach a message packet sequence number to the packet header of the individual message packets to be stored in said memory cells as auxiliary identifiers, said message packet sequence numbers being set to a defined initial value during the course of the connection set up of the respective virtual connection; and
- means for incrementing the message packet sequence number upon each selection of a respective memory cell.

9. The circuit arrangement of claim 8, wherein said handling means comprises:

- means for attaching a self-routing header to the packet headers of the message packets to be transmitted to the redundant switching matrices and respectively defined for the respective virtual connection, said self-routing header additionally stored in said memory cells of said memory means of said handling means.

10. The circuit arrangement of claim 9, wherein each of said evaluation devices comprises:

- a comparator arrangement for comparing the auxiliary identifier contained in a message packet just accepted by one of said redundant switching matrices t the auxiliary identifier offered by said memory means and, upon coincidence of the two auxiliary identifiers, controlling the transmission of the respective message packet to the aligned output trunk.

11. The circuit arrangement of claim 10, wherein:

- said handling means comprises a check signal generator operable to additionally attach a respective check information to the message packets; and
- each of said evaluation means comprises a check device operable to perform a check in view of a faultless transmission of the respective message packet or, respectively packet header on the basis of the check information respectively attached to the message packets accepted by the allocated switching matrices; and
- means for evaluating the auxiliary identifier attached to a message packet only given a faultless transmission of a message packet.

* * * * *